United States Patent

[11] 3,602,697

[72] Inventors Toshio Tanaka;
Yukio Mizuta, both of Kyoto, Japan
[21] Appl. No. 672,324
[22] Filed Oct. 2, 1967
[45] Patented Aug. 31, 1971
[73] Assignee Omron Lateisi Electronics Co.
Kyoto, Japan
[32] Priority Oct. 4, 1966
[33] Japan
[31] 41/65541

[54] CARD-READING SYSTEM
9 Claims, 10 Drawing Figs.

[52] U.S. Cl. .......... 235/61.11 D
[51] Int. Cl. .......... G06k 7/08
[50] Field of Search .......... 235/61.114, 61.115, 61.9, 61.7 B, 61.11; 209/111.7; 340/146.3

[56] References Cited

UNITED STATES PATENTS

| | | | |
|---|---|---|---|
| 2,952,008 | 9/1960 | Mitchell et al. | 235/61.114 |
| 3,122,237 | 2/1964 | Stenstrom | 209/111.7 |
| 3,356,021 | 12/1967 | May et al. | 235/61.9 |
| 3,184,714 | 5/1965 | Brown, Jr. et al. | 235/61.7 B UX |
| 3,211,470 | 10/1965 | Wilson | 235/61.11 |
| 3,277,283 | 10/1966 | Rabinow et al. | 340/146.3 UX X |
| 3,483,511 | 12/1969 | Rabinow | 340/146.3 |

*Primary Examiner*—Maynard R. Wilbur
*Assistant Examiner*—William W. Cochran
*Attorney*—Christensen and Sanborn

ABSTRACT: A system for reading information recorded on a card in first and second rows of different code markings, wherein the recorded information can be successfully compared with stored reference code information regardless of the direction in which the card is inserted into the system. The code information on the card is arranged along a primary dimension thereof and the card is received in the system to be moved in a direction along the primary dimension, but it can be read properly whether it is inserted face up or down or whether inserted in a forward or reverse direction. The disclosed system includes means for detecting the difference between the code markings in the first and second rows, providing a signal indicating the orientation of the card, and means responsive to the difference-detecting means for providing in first and second outputs signals corresponding to the code markings in the first and second rows, regardless of the orientation of the card upon insertion. Other features include reading means for detecting markings spaced in rows located either along the centerline of the card or spaced symmetrically on opposite sides thereof; means for storing, in either forward or reverse sequence, the information code recorded on the card and means for storing the reference code in forward and reverse sequence for comparison simultaneously with the stored information code to provide the required comparison signal; means for gating to information code storage means the information code signals corresponding to the markings on the card in such a way that the information code is always stored in a forward sequence for comparison with the reference code, whether received in forward or reverse sequence as determined by the direction of insertion of the card; and a reversible counter for controlling gating means applying the information code signals to the information storage means in a sequence determined by the direction of insertion of the card.

YUKIO MIZUTA
YOSHIO TANAKA
INVENTORS

BY Christensen, Sanborn & Matthews
ATTORNEYS

YUKIO MIZUTA
YOSHIO TANAKA
INVENTORS

BY Christensen, Sanborn & Matthews
ATTORNEYS

YUKIO MIZUTA
YOSHIO TANAKA
INVENTORS
BY Christensen, Sanborn & Matthews
ATTORNEYS

YUKIO MIZUTA
YOSHIO TANAKA
INVENTORS

BY Christensen, Sanborn & Matthews
ATTORNEYS

YUKIO MIZUTA
YOSHIO TANAKA
INVENTORS
BY Christensen, Sanborn & Matthews
ATTORNEYS YUKIO MIZUTA
YOSHIO TANAKA
INVENTORS
BY Christensen, Sanborn & Matthews
ATTORNEYS

CARD-READING SYSTEM

BACKGROUND AND SUMMARY OF THE INVENTION

This invention relates to a card-reading system and more particularly to improvements in a system for reading the various informations contained in cards used in various credit sale systems.

In recent years, credit sale systems have achieved a wide acceptance and are used for selling or purchasing various types of service and product. To take an automatic ticket gate provided at a railway station for example. When a person inserts his or her ticket (credit card) into the slot of the automatic ticket gate, the information contained in the card is read by a card reader in the machine, so that the wicket bar or something is opened or kept closed with or without acoustic and/or visual warning, depending upon the validity or invalidity of the card that has been inserted. The information given on such tickets is generally in the form of magnetic inked symbols or characters, punched holes, etc. arranged in accordance with a predetermined pattern or code. If the card is of a rectangular shape, as is generally the case with such cards, and if the slot of the card reader is of a length just long enough to accept the shorter width of the card, the card may be inserted into the slot in four different manners, that is, with one edge of the shorter width forward, or its opposite edge forward, and in either of the two cases, the card may be inserted with its obverse side turned reverse. If the card reader is so arranged that it can read the information on the card only when it is inserted therein in a predetermined one of the above four different manners, the card reader does not work if the card is inserted otherwise.

Heretobefore, therefore, it was required that the card be inserted into the card reader in a single predetermined manner and not otherwise, and the cards are provided with some kind of indication on it, such as an arrow mark to enable the users of the card to properly insert it into the machine. This, however, certainly is inconvenient, and passengers may have to stop for a while before inserting their cards into the gate to make sure of the direction of insertion, with resulting reduction in the passage efficiency of the gate.

Accordingly, the primary object of the invention is to provide a card-reading system which is capable of reading the information on the card inserted thereinto, regardless of the manner of inserting the card.

Other objects of the invention will become apparent from the following description with reference to the accompanying drawings, wherein.

Figure 1A:
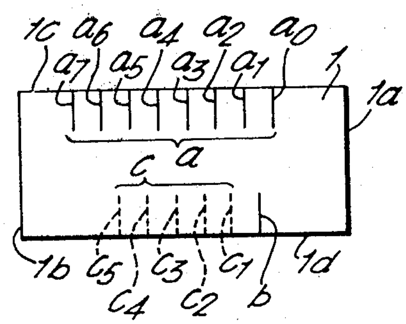
FIGS. 1A and 1B are plan views of two different types of cards used in the system of the invention.

Referring now in detail to the drawings, first to FIG. 1, there is shown a card 1 of a rectangular shape defined by an opposed pair of longer edges of shorter edges or sides 1*a* and 1*b* and an opposed pair of longer edges or sides 1*c* and 1*d*. There are two areas *a* and *c* extending along the longer edges of the card. The area *a* contains shift code marks arranged in a single row while the other area *c* contains information code marks arranged in a single row. A single row of code marks expresses a single piece of information, so that for several pieces of information the corresponding number of rows are required. For simplicity of explanation, however, a single row of information code marks is shown in the drawing. Preferably, the code marks are recorded on the card in magnetic ink. A well-known reproducing or reading head of a magnetic recorder will be used as a detector of the code marks. A proximity detector sensitive to the magnetic ink may also be used. Code marks may also be recorded in the card in ordinary ink if they are distinguishable by a different degree of light reflection provided by the ink from the other surface area of the card. Code marks may be recorded in the form of punched holes. In the last two cases, a photosensitive device will be used as a detector of the code marks.

In FIG. 1A, there are provided eight shift code marks *a*0 to *a*7 which serve to provide timing, as will be described later. For information code there are five positions as shown by dot lines *c*1 to *c*5, which are located between adjacent pairs of the shift code marks in FIG. 1A. In the illustrated embodiments, at two out of the five positions there are placed two information code marks, which express a single piece of information in the well-known two-out-of-five code. Binary or other codes may also be employed.

The card is also provided with a code mark *b* by which to detect the direction in which the card is inserted in a slot 60 provided in the ticket gate's card-receiving means 62. The code mark *b* is located at one side (right-hand side as viewed in FIG. 1A) of the information code area *c* and at a position corresponding to that intermediate the shift code marks *1*0 and *a*l. There is no such mark at the opposite side of the code area *c*. Therefore, if a detector detects the code mark *b* before it detects an information code mark, it means that the card has been inserted with its edge 1*a* forward, that is, in the forward direction. On the contrary, if the detector detects an information code mark first, the card has been inserted with its opposite edge 1*b* forward, that is in the backward or reverse direction.

Figure 2:
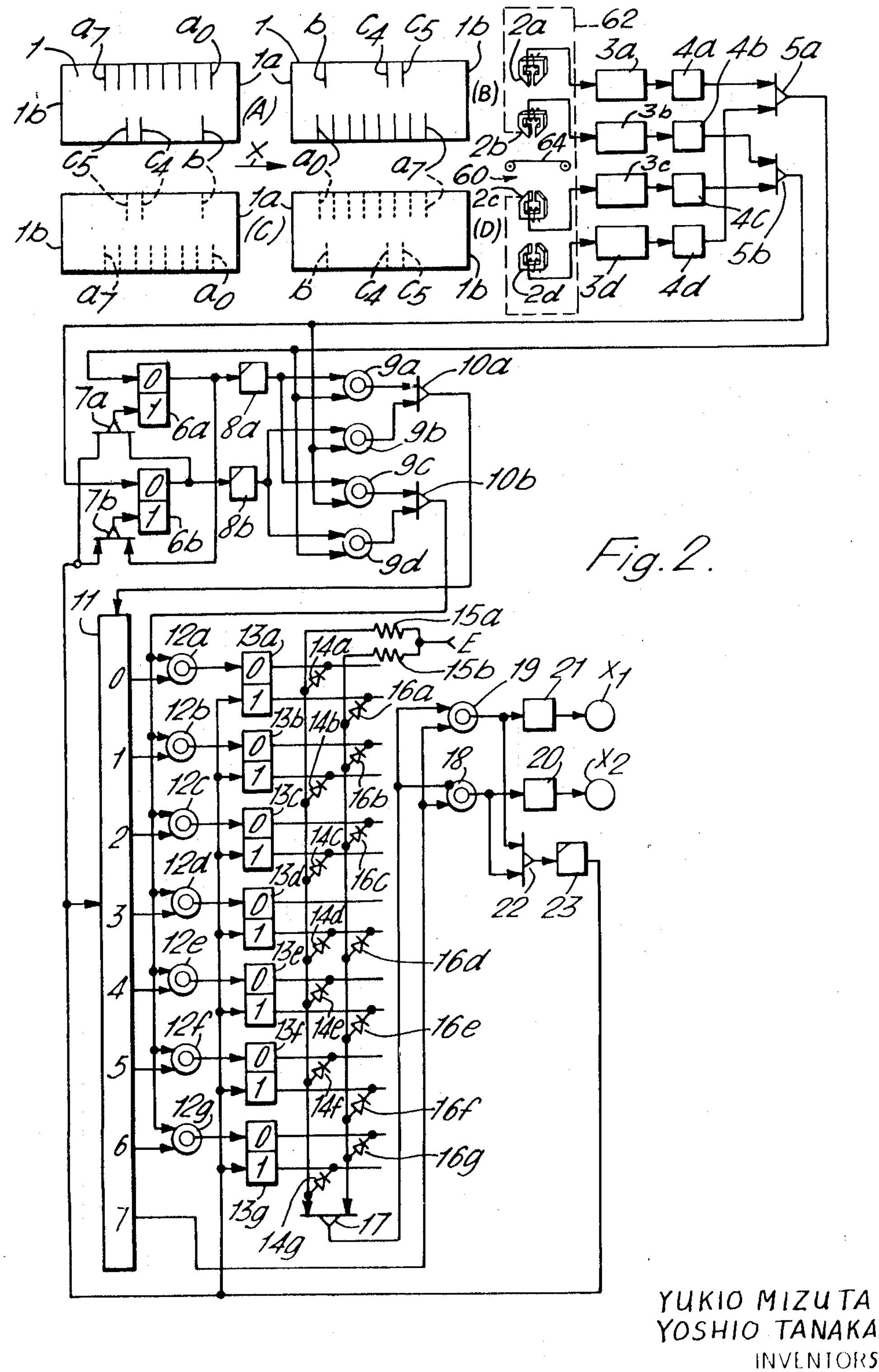
FIG. 2 shows the circuit diagram of one embodiment of the invention, with a card shown in four different manners of insertion.

Turning to FIG. 2, a single card is illustrated in four different manners A, B, C and D in which it may be inserted in the direction X into the machine slot. In manner A, the card is inserted in the forward direction, with its obverse (on which the code marks are recorded) held upside; in manner B, the card is inserted in the backward direction, with its obverse held upside; in manner C, the card is inserted in the forward direction, with its reverse turned upside; and in manner D the card is inserted in the backward direction, with its reverse turned upside. The card is provided with two information code marks at the positions *c*4 and *c*5.

There are two pairs of detectors 2*a*, 2*b*, 2*c* and 2*d*, such as magnetic reproducing heads, arranged inside the slot 60 of the gate's card-receiving means 62. The upper two 2*a* and 2*b* face the obverse of the card, while the lower two 2*c* and 2*d* face the reverse thereof. The arrangement is such that the head 2*a* faces the shift code marks when the card is inserted in manner A, and the information code marks and the direction distinguishing code mark *b* when the card is inserted in manner B; the head 2*b* faces the information code marks and the distinguishing code mark when the card is inserted in manner A, and the shift code marks when the card is inserted in manner B; the head 2*c* detects the information code marks and the distinguishing code mark when the card is inserted in manner C, and the shift code marks when the card is inserted in manner D; and the head 2*d* faces the shift code marks when the card is inserted in manner C, and the information code marks and the distinguishing code mark when the card is inserted in manner D.

The card that has been inserted into the slot 60 is moved by a suitable conveying means 64 past the detectors 2*a*–2*d*, which scan the surfaces of the card. Each time each detector detects a code mark, it produces an output pulse to be applied through an amplifier 3*a*–3*d* to a wave-shaping circuit 4*a*–4*d*, such as a Schmidt circuit. The outputs from the circuits 4*a* and 4*d* are applied to an OR element 5*a* and the outputs from the circuits 4*b* and 4*c*, to an OR element 5*b*. When the card is inserted with its edge 1*a* forward, that is, in the forward direction, the OR element 5*a* produces output pulses as the shift code marks are detected one after another, and the OR element 5b produces output pulses as the distinguishing code mark and the information code marks are detected one after another. When the card is inserted with its opposite edge 1b forward, that is, in the backward or reverse direction, the OR element 5b produces output pulses corresponding to the shift code marks on the card and the OR element 5a produces output pulses corresponding to the information code marks and the distinguishing code mark. It should be noted that when the card is inserted in the backward direction, the information code marks and the distinguishing code mark are detected in the order opposite to that when the card is inserted in the forward direction.

Whether the card has been inserted in the forward or backward direction, either the OR element 5a or 5b produces an output corresponding to a shift code mark first. When the card has been inserted in the forward direction in manner A or C, the OR element 5a produces a first output pulse upon detection of the shift code mark *a*0. This output pulse sets a flip-flop 6a, the set output of which is applied as a reset input to a flip-flop 6b through an OR element 7b. So long as the reset input continues, the flip-flop 6b will not be set. When the card has been inserted in the backward direction in manner B or D, the OR element 5b produces a first output pulse upon detection of the shift code mark *a*7. This output pulse sets the flip-flop 6b, the set output of which is applied as a reset input to the flip-flop 6a. So long as the reset input continues, the flip-flop 6a will not be set. It will be seen that the setting of the flip-flop 6a means that the card has been inserted in the forward direction, while the setting of the other flip-flop 6b means that the card has been inserted in the backward direction.

The set output from the flip-flop 6a is also applied through an on-delay element 8a to one of the two input terminals of each of AND elements 9a and 9c, while the set output from the flip-flop 6b is also applied through an on-delay element 8b to one of the two input terminals of each of AND elements 9b and 9d. The other input to the AND elements 9a and 9d is the output from the OR element 5a, while the other input to the AND elements 9b and 9c is the output from the OR element 5b. The outputs from the AND elements 9a and 9b are applied to an OR element 10a and the outputs from the AND elements 9c and 9d, to an OR element 10b.

Since the setting of the flip-flop 6a presupposes the introduction of a card in the forward direction, as previously mentioned, the AND element 9a produces an output pulse every time the detector 2a or 2d detects a shift code mark, and the AND element 9c produces an output pulse according as the detector 2b and 2c detects each of the distinguishing code mark and the information code marks. In like manner, since the setting of the flip-flop 6b presupposes the introduction of the card in the reverse direction, the AND element 9b produces one output pulse for very one of the shift code marks that has been detected by the detector 2b or 2c, and the AND element 9d produces one output pulse for every one of the information code marks and the distinguishing code mark that has been detected by the detector 2a or 2d. Thus, the OR element 10a always produces output pulses corresponding to the shift code marks on the card, while the OR element 10b always produces output pulses corresponding to the distinguishing code mark and the information code marks.

The delay time provided by the on-delay elements 8a and 8b is set to a little longer period of time than that for which the outputs from the OR elements 5a and 5b caused by the detection of the first of the shift code marks last, in order that the OR element 10a may not produce any output pulse upon detection of the first of the shift code marks. As a result, the OR element 10a produces an output pulse upon detection of each of the second and succeeding shift code marks.

The output pulses from the OR element 10a are successively applied to an octal pulse counter 11 to cause it to step forward from "0" to "7." The output pulses from the OR element 10b are applied to one of the two input terminals of each of AND elements 12a to 12g, to the other input terminals of which are applied the outputs terminals "0" to "6" of the counter 11.

Suppose that a card has been inserted in manner A. Detection of the first shift code mark *a*0 on the card causes the AND element 9a to get ready to produce output pulses upon detection of the succeeding shift code marks *a*1 to *a*7 and at the same time the AND element 9c to be ready to produce an output pulse upon detection of each of the distinguishing code mark and the information code marks. When the distinguishing code mark *b* is then detected (at this time the delay time set in the element 8a is over and the element 8a has produced an output pulse, which is applied to one input of the AND elements 9a and 9c), the output pulse from the OR element 5b is applied to the other input of the AND element 9c, whereupon this AND element 9c produces an output pulse to be applied through the OR element 10b to one input of the AND element 12a as well as 12b–12g. At this time the counter 11 has not yet made any forward step but is producing an output at its "0" output terminal, so that the AND element 12a receiving two inputs produces an output to set a flip-flop 12a.

When the next shift code mark *a*1 is detected, the AND element 9a produces an output pulse, which is applied through the OR element 10a to the counter 11 to cause the same to make one forward step, shifting its output from its "0" to "1" output terminal. This output is applied to one input of the AND element 12b. However, the flip-flop 13b is not set since the information code marks *c*4 and *c*5 are yet to be detected and consequently no output is produced by the OR element 10b to be applied to the other input of the AND element 12b while the "1" output from the counter is being applied to the one input of the AND element. As the shift code marks *a*1 and *a*3 are detected, the counter 11 steps from "1" to "2" and thence to "3." However, the information code marks are not yet detected, so that the flip-flop 13c and 13d remain reset. When the shift code mark *a*4 has been detected, an output appears at the "4" terminal of the counter 11. Under this condition, when the information code mark *c*4 is detected, the AND element 12e receives two inputs, so that it produces an output to set a flip-flop 13e. In like manner, when the next information code mark *c*5 is detected, the AND element 12f produces an output to set a flip-flop 13f. However, when the next shift code mark *a*6 is detected, no output is produced from the AND element 12g to be applied to a flip-flop 13g, which remains reset. When the last shift code mark *a*7 is detected, the output at the "7" output terminal of the counter is applied as an input to an INHIBIT element 18 and an AND element 19. This means that the reading of the card information has been completed.

Thus, if the presence and absence of the set output of the flip-flops are expressed by "1" and "0," respectively, the set output condition of the flip-flops 13a–13g will be "1 0 0 0 1 1 0" when the reading of the information on the card inserted in manner A has been finished. In like manner, if the presence and absence of the distinguishing code mark and the information code marks between each adjacent pair of the shift code marks *a*0 to *a*7 is expressed by "1" and "0," respectively, the card that is inserted in manner A presents a code of "1 0 0 0 1 1 0," which is exactly the same as the output condition of the flip-flops 13a–13g. This means that the coded information of the card inserted in manner A has now been read and memorized as the set output condition of the flip-flops 13a–13g.

The code marks on the card that is inserted in manner C are detected by the detectors 2c and 2d in quite the same manner as those on the card inserted in manner A, so that flip-flops 13a–13g present the same set output condition for the card inserted in manner C as for the card inserted in manner A.

When the card is inserted in manner B or D, the code mark *a*7 performs the same function as the code mark *a*0 when the card was inserted in manner A or C. That is, when the code mark *a*7 is detected, the flip-flop 6b is set, and when the next code mark *a*6 is detected, the counter 11 is caused to make one forward step to produce an output at the "1" terminal. Under this condition, when the information code mark *c*5 is detected, the AND element 12b produces an output, which sets the flip-flop 13b. In like manner, the flip-flops 13c and 13g are set while the other flip-flops 13*d*–13*f* remain reset. Thus, upon completion of the reading of the card information, the set output condition of the flip-flops 13*a*–13*g* is expressed as "0 1 1 0 0 0 1," which is opposite in order to that when the card was inserted in the forward direction, that is, in manner A or C.

To the set and reset output terminals of the flip-flops 13*a*–13is connected a memorizing network comprising a pair of diode AND circuits, in which a reference-coded information of a proper or valid card is memorized beforehand. When the set and reset output conditions of the flip-flops 13*a*–13caused by an inserted card conform to the reference-coded information memorized in the diode AND circuits, that card is recognized as a proper one. Since the output condition of the flip-flops 13*a*–13*g* caused by a card inserted in the forward direction is opposite to that caused by the same card inserted in the backward direction, there are two diode AND circuits provided to memorize the same reference information code in opposite orders. In practice, such diode AND circuits may comprise a pinboard having a plurality of pinholes and pins each containing a diode and adapted to be inserted into the pinholes in accordance with the reference information code to be memorized. In the illustrated embodiment, the valid information is coded as "1 0 0 0 1 1 0," as previously mentioned. To provide a memory of that code, diodes 14*a*, 14*e* and 14*f* have their respective cathodes connected to the set output terminals of the flip-flops 13*a*, 13*e* and 13*f*, and diodes 14*b*, 14*c*, 14*d* and 14*g* have their respective cathodes connected to the reset outputs of the flip-flops 13*b*, 13*c*, 13*d* and 13*g*. The anodes of the diodes 14*a*–14*g* are all connected between an OR element 17 and one end of a resistor 15*a*, to the other end of which is connected a source terminal E. The voltage at the terminal E and the set and reset output voltages of the flip-flops 13*a*–13*g* are still positive and DC voltages. It is only when the set output condition of the flip-flops 13*a*–13*g* is "1 0 0 0 1 1 0" (under this condition, the reset output condition is "0 1 1 0 0 0 1" that an input is applied to the OR element 17.

When the same card is inserted in the backward direction, the set output condition of the flip-flop 13*a*–13*g* is reversed to be "0 1 1 0 0 0 1." Under this condition, in order for an input to be applied to the OR element 17, diodes 16*a* –16*g* have their respective cathodes connected to the set outputs of the flip-flops 13*b*, 13*c*, 13*g* and to the reset outputs of the flip-flops 13*a*, 13*d*, 13*e* and 13*f*. The anodes of the diodes 16*a*–16*g* are connected between the other input of the OR element 17 and one end of a resistor 15*b*, the other end of which is connected to the source terminal E.

The output of the OR element 17 is applied to the inhibit terminal of the INHIBIT element 18 and the other input of the AND element 19.

Thus, when a card is recognized as proper and valid, an inhibit signal is applied to the INHIBIT element 18, which produces no output, but the AND element 19 receiving the outputs from the OR element 17 and the "7" terminal of the counter 11 produces an output. This output is amplified by an amplifier 21 and energizes a relay X1. The operation of the relay may be used, for example, to open a closed gate for a passenger to pass through. On the contrary, if the card is recognized as improper and invalid, the INHIBIT element 18 only produces an output, which energizes a relay X2 through an amplifier 20. The operation of the relay X2 may be used, for example, to ring a buzzer to give a warning against the use of an invalid card.

The outputs of the elements 18 and 19 are also applied through an OR element 22 to an on-delay element 23, the output of which resets all the flip-flops and the counter for restoration of the original condition of the system.

In the above embodiment, the bit number for information code is five, with eight bits for shift code. The bit numbers are variable, with corresponding change in the capability of the counter 11 and the number of the flip-flops to be connected to the output of the counter.

Figure 1B:
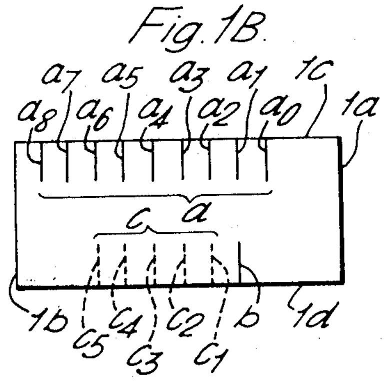
Figure 3A:
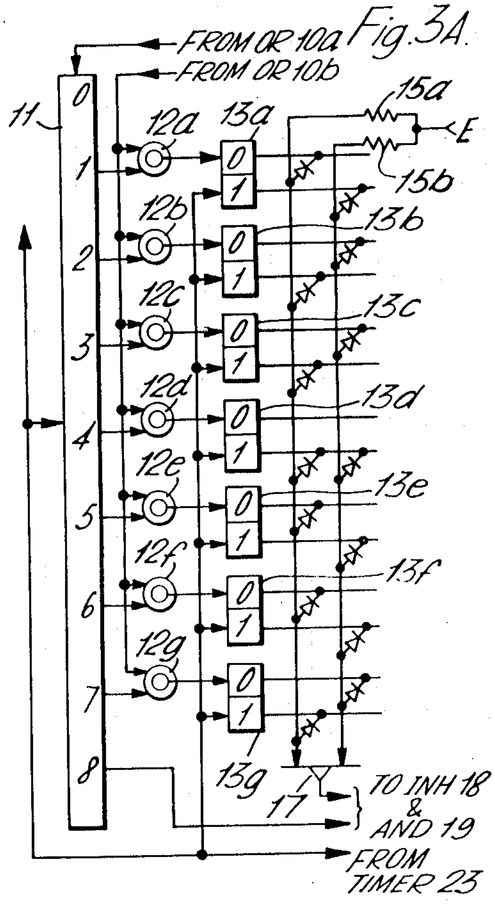
FIG. 3A shows part of a modified form of the system shown in FIG. 2.

The code arrangement on the card may also be such as shown in FIG. 1B, wherein the positions *b* and *c1*–*c5* for the distinguishing code mark and the information code marks are laterally aligned with those for the shift code marks *a1*–*a5*, respectively. In this case, the pulses produced upon detection of the distinguishing code mark and the information code marks coincide with those produced upon detection of the corresponding laterally aligned shift code marks. Therefore, it is required that the connection between the counter 11 and the memorizing flip-flops with the AND elements and the diode AND circuits be shifted to one larger numbered output terminals of the counter. To meet the requirement, therefore, the counter 11 must be a nonary counter as shown in FIG. 3A, to the output terminals "1" to "7" of which the AND elements 12*a*–12*g* are connected, respectively. The operation of the circuit arrangement of FIG. 3A will be easily understood from the foregoing description.

Figure 3B:
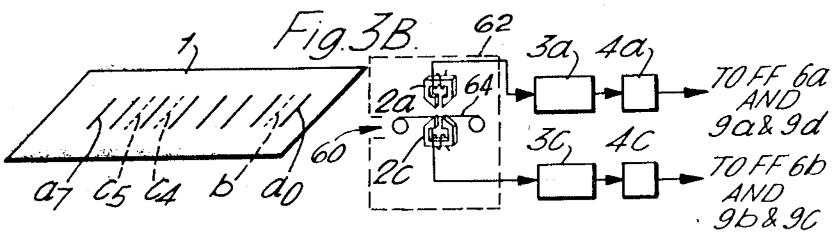
FIG. 3B shows a different card and part of another modification of the system of FIG. 2.

As shown in FIG. 3B, the shift code marks may be recorded on one (upper) surface of the card and the information code marks and the distinguishing code mark, on the other (under) surface thereof, both along the centerline in the direction of movement of the card. The arrangement has the advantage that only a pair of detectors 2*a* and 2*c* facing the upper and under surfaces of the card, respectively, suffice, so that only two amplifiers 3*a* and 3*c* and two Schmidt circuits 4*a* and 4*c* are required, and that the OR elements 5*a* and 5*b* in FIG. 2 can be omitted.

Figure 4:
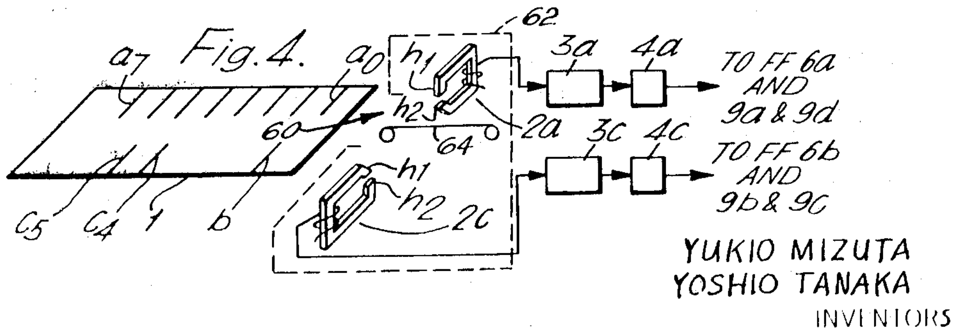
FIG. 4 shows the card shown in FIG. 2 and still another modification of the system of FIG. 2.

The same advantage can be attained by the arrangement of FIG. 4, with the use of the card shown in FIG. 1A or 1B. In this case, the card is passed through a gap between the opposed poles *h1* and *h2* of each detector 2*a*, 2*b*, so that the poles can scan both surfaces of the card.

The outputs from the Schmidt circuits 4*a* and 4*c* in FIGS. 3B and 4 may be connected to the flip-flop 6*a*, and AND elements 9*a*, 9*d*, and the flip-flop 6*b*, the AND elements 9*b*, 9*c* in FIG. 2, respectively.

Figure 5:
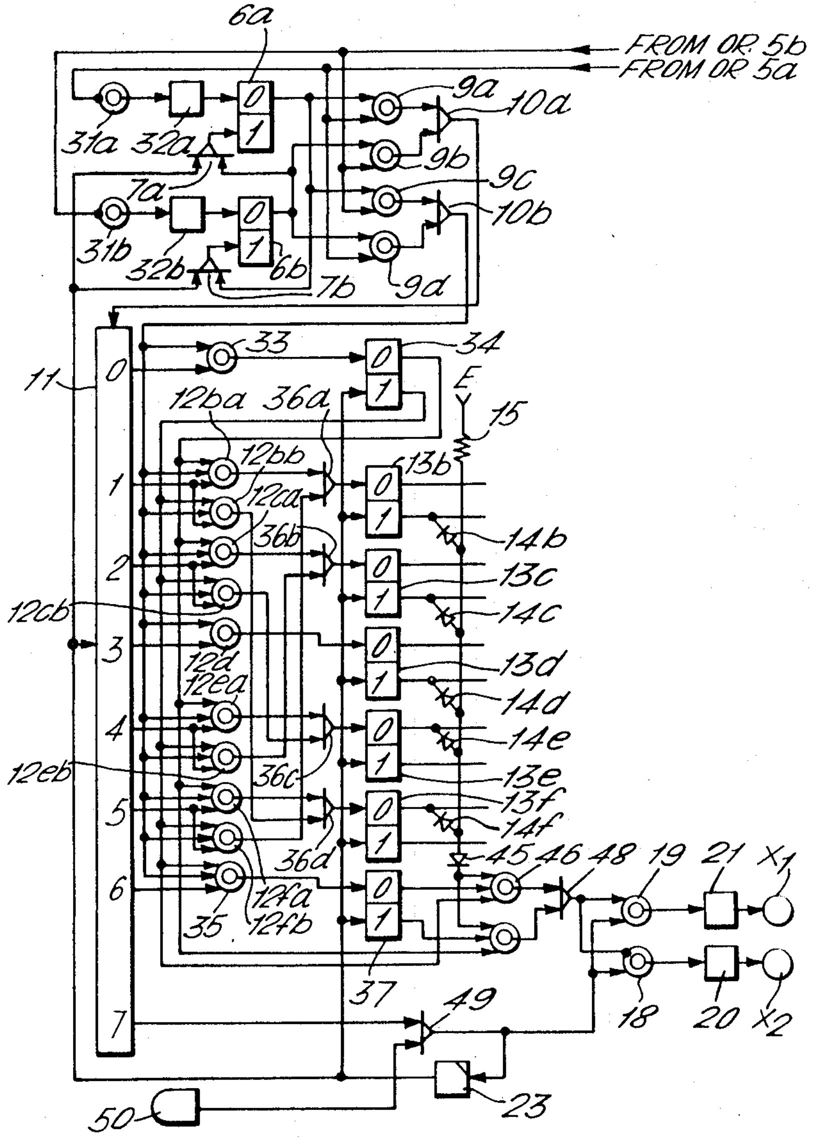
FIGS. 5 to 8 show various other modifications of the system of FIG. 2.

In the above embodiments, two diode AND circuits are provided to memorize a single-reference (valid) information code. It is possible to achieve the same result with a single diode AND circuit, as shown in FIG. 5. It is understood that the network of FIG. 5 is to be connected to the outputs of the OR elements 5*a* and 5*b* of FIG. 2. As previously mentioned, when a card is inserted in the forward direction (in manner A or C), the OR element 5*a* produces output pulses one by one as the shift code marks on the card are detected, and the OR element 5*b* produces output pulses one by one as the distinguishing code mark and the information code marks are detected; and when the card is inserted in the backward direction (in manner B or D), the OR element 5*a* produces output pulses upon detection of the information code marks and the distinguishing code mark and the OR element 5*b* produces output pulses upon detection of the shift code marks.

The output pulses from the OR elements 5*a* and 5*b* are applied through NOT elements 31*a* and 31*b*, and differentiators 32*a* and 32*b*, respectively, to the set inputs of the flip-flops 6*a* and 6*b*, respectively. The NOT elements and the differentiators are provided in place of the on-delay elements 8*a* and 8*b* in FIG. 2. When the first shift code marks *a0* is detected, an input is applied to the NOT element 31*a*. When this input disappears, the NOT element produces an output to be applied to the differentiator 32*a*, the output from which sets the flip-flop 6*a*. If the first shift code mark that has been detected is *a7*, an input is applied to the other NOT element 31*b*, and when this input disappears, the differentiator 32*b* produces an output to set the flip-flop 6*b*. In either case, when the next shift code mark *a1* or *a6* is detected, the OR element 10*a* produces an output, which causes the counter 11 to make one forward step. The output from the other OR element 10*b* is applied to one input of an AND element 33.

Suppose that the card shown in FIG. 2 has been inserted in the forward direction (in manner A or C). Before the second shift code mark *a1* is detected, that is, while the counter 11 produces an output at its "0" output terminal, which is applied to the other input of the AND element 33, the distinguishing code mark *b* will have been detected, whereupon the OR element 10*b* produces an output to be applied to the one input of the AND element 33. As a result, the AND element 33 produces an output to set a flip-flop 34. However, when the card is inserted in the backward direction, (in manner B or D), the shift code marks *a*7 and *a*6 are successively detected, there existing no distinguishing code mark to be detected therebetween, so that no output is produced from the OR element 10*b* and the flip-flop 34 remains reset. In short, the insertion of the card in the forward direction results in the setting of the flip-flop 34, while the insertion of the card in the backward direction maintains the reset condition of the flip-flop 34. The flip-flop 34, once set, remains so until the reading of that card is completed.

The counter 11 has its "1" output terminal connected to AND elements 12*ba* and 12*bb;* its "2" output terminal connected to AND elements 12*ca* and 12*cb*, its "3" output terminal connected to an AND element 12*d;* its "4" output terminal connected to AND elements 12*ea* and 12*eb;* and its "5" output terminal connected to AND elements 12*fa* and 12*fb*. The "3" output terminal is connected to the AND element 12*d* only for this reason: The output at the "3" terminal of the counter continues from the time when the shift code mark *a*3 or *a*4 was detected to the time when the next shift code mark *a*4 or *a*3 is detected. The information code mark *c*3 which is detected between the two shift code marks *a*3 and *a*4 is positioned in the middle of the five bits for information code, as viewed from either of the forward and backward directions of insertion of the card, so that the pulse caused by the detection of the code mark *c3* is produced always during the time when an output exists at the "3" terminal of the counter, whether the card has been inserted in the forward or backward direction. If the bit number provided for information code is any other other odd number than 5, there is always one output terminal of the counter to which only one AND element is connected. However, if the number is an even one, two AND elements must be connected to each output terminal of the counter.

The set output of the ba34 is applied to a second input of each of the AND elements 12*ba*, 12*ea* and 12*fa*; and the reset output of the flip-flop 34, to a second input of each of the AND elements 12*bb*, 12*cb*, 12*eb* and 12*fb* and also to one input of an AND element 35, to a second input of which the output of the "6" output terminal of the counter 11 is applied. The AND elements 12*ba*–12*fb* also receive the output pulses from the OR element 10*b* caused by the detection of the information code marks and the distinguishing code mark. The outputs of the AND elements 12*ba* and 12*fb* are applied through an OR element 36*a* to the set input of the flip-flop 13*b;* the outputs of the AND elements 12*ca* and 12*eb*, through an OR element 36*b* set input of the flip-flop 13*c;* the output of the AND element 12*d*, directly to the set input of the flip-flop 13*d;* the outputs of the AND elements 12*ea* and 12*cb* through an OR element 36*c* to the set input of the flip-flop 13*e*; the outputs of the AND elements 12*fa* and 12*bb*, through an OR element 36*d* to the set input of the flip-flop 13*f*; and the output of the AND element 35, to the set input of a flip-flop 37.

To the output side of the flip-flops 13*b*–13*f* is connected a single diode AND circuit for memorizing a reference-coded information of a valid card. In FIG. 2, a valid card presented the seven-bit code "1 0 0 0 1 1 0" when it was inserted in the forward direction. In FIG. 5, however, the code to be memorized is a five-bit code of "0 0 0 1 1," with the two bits for the direction-distinguishing code having been omitted from the opposite ends of the seven-bit code in FIG. 2. Accordingly, diodes 14*b*–14*d* have their respective cathodes connected to the reset outputs of the flip-flops 13*b*–13*d* and diodes 14*e* and 14*f* have their respective cathodes connected to the set outputs of the flip-flops 14*e* and 14*f*. The anodes of the diodes 14*b*–14*f* are all connected through a resistor 15 to a source terminal E. The output of the diode AND circuit is applied through a diode 45 to one input of each of AND elements 46 and 47.

FIG. 5 is arranged for the card shown in FIG. 2. Now suppose that the card has been inserted in the forward direction. As previously mentioned, upon detection of the code marks *a*0 and *b* the flip-flop 34 is set. As the codes marks *a*1–*a*4 are detected in succession, the counter 11 makes corresponding steps, shifting its output from the terminals "1" through "3." During this period of time, no information code mark has been detected, so that no output has been produced by the OR element 10*b* and consequently from the AND elements 12*ba*, 12*ca*, and 12*d*. However, while an output exists at the "4" terminal of the counter upon detection the code mark *a*4, the information code mark *c*4 is detected, whereupon the AND element 12*ea* produces an output to be applied through the OR element 36*c* to set the flip-flop 13*c*. In like manner, when the code mark *c*5 is detected, the AND element 12*fa* produces an output to be applied through the OR element 36*d* to set the flip-flop 13*f*. Thus, the AND element 46 receives one input through the diode 45. When upon subsequent detection of the next code mark *a*6, an output appears at the "6" terminal of the counter 11, the AND element 35 produces no output due to the absence of any output from the OR element 10*b*, so that the flip-flop 37 remains reset. Prior to this, when the code mark *c*5 was detected, the AND element 47 received all its three inputs. The output of the AND element 47 is applied through an OR element 48 to one input of the AND element 19 and also to the inhibit terminal of the INHIBIT element 18, so that when the code mark *a*7 is detected, an output appears at the "7" terminal of the counter 11 so as to be applied through an OR element 49 to the other input of the AND element 19, whereupon it produces an output to energize the relay X1. It will be understood that if the card is invalid, the other relay X2 is energized.

In FIG. 5 a card passage detector 50 is provided, so that when the inserted card has passed the detectors 2*a*–2*d*, the detector 50 produces an output, which is applied through the OR element 49 to an on-delay element 23. The output from the on-delay element is used to reset all the flip-flops as well as the counter 11. Thus, when an invalid card such as one having no code marks thereon has been inserted, the relay X2 is energized and at the same time the counter 11 and all the flip-flops are reset.

When the card is inserted in the backward direction, the flip-flop 34 remains reset. When the shift mark *a*6 is detected, an output appears at the "1" output terminal of the counter 11, and when the code mark *c*5 is detected, the AND element 12*bb* produces an output to be applied through the OR element 36*d* to set the flip-flop 13*f*. When the next code mark *c*4 is detected, the AND element 12*cb* produces an output to be applied through the OR element 36*c* to set the flip-flop 13*e*. Finally when the code mark *b* is detected, the flip-flop 37 is set. During the course of events, the flip-flops 13*b* and 13*d* remain reset. Thus, the set and reset output conditions of the flip-flops 13*b*–13*f* are quite the same as when the card was inserted in the forward direction.

When the flip-flop 37 is set, the AND element 46 produces an output and when the last code mark *a*0 is detected, the relay X1 is energized. Thus, a single-diode AND circuit suffices to memorize the coded information of a valid card, regardless of the direction of insertion of cards.

Figure 6:
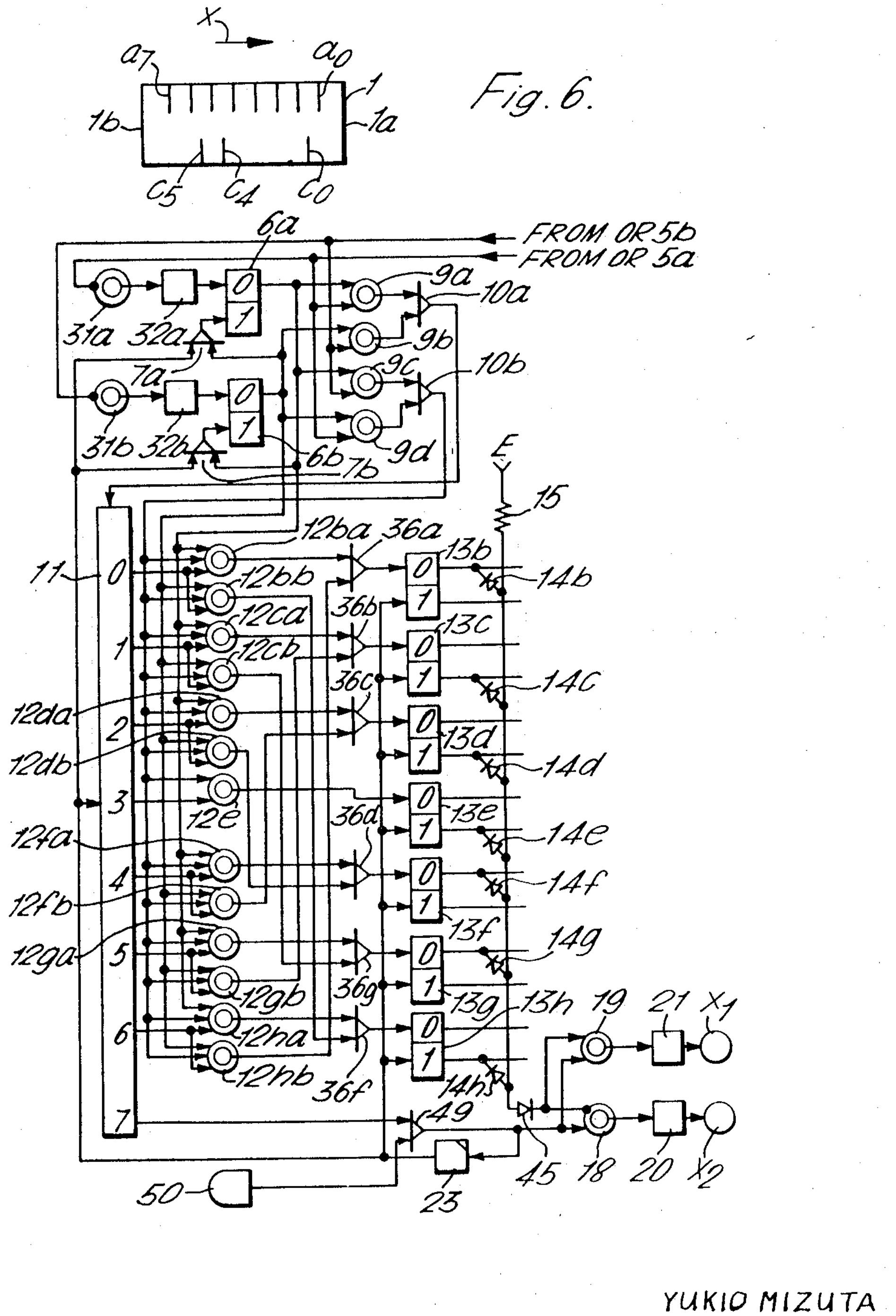

In the above embodiments, the card is provided with the code mark *b* by which to distinguish between the directions in which the card is inserted. Where there is no sufficient space available for such a code mark, however, it is desirable to dispense with it. FIG. 6 shows an arrangement to enable this. Let us recall the operation of the flip-flops 6*a* and 6*b* in FIGS. 2 and 5. When the card was inserted in the forward direction, the flip-flop 6*a* was set, while when it was inserted in the reverse direction, the flip-flop 6*b* was set. Thus, the direction in which the card has been inserted can be known by which of the two flip-flops 6*a* and 6*b* has been set.

In FIG. 6 the card has as many as seven bits for information code, and the network contains a single-diode AND circuit for memorizing the reference-coded information of the valid card. Due to the increase in the bit number for the code, AND elements 12*ga*, 12*gb*, 12*ha*, 12*hb*; OR elements 36*e*, 36*f* and flip-flops 13*g* and 13*h* are provided in addition to those in FIG. 5. Accordingly, the diode AND circuit additionally includes diodes 14*g* and 14*h*. Instead, the AND element 35, the flip-flop 37, the AND elements 46 and 47 and the OR element 48 in FIG. 5 are set not required in the arrangement of FIG. 6. The output of the diode AND circuit is applied through the diode 45 to one input terminal of the AND element 19 and the inhibit terminal of the INHIBIT element 18.

In FIG. 6, the information is recorded on the card in the three-out-of-seven code, as shown at *c*0, *c*4 and *c*5. When the card is inserted in the forward direction designated by the arrow X, the information code on the card is expressed as "1 0 0 0 1 1 0." It is required, therefore that the set output conditions of the flip-flops 13*b*–13*h* be expressed as "1 0 0 0 1 1 0," whether the card may have been inserted in the forward or backward direction.

Suppose first that the card has been inserted in the forward direction. Upon detection of the mark *a*0 the flip-flop 6*a* is set, and its set output is applied to the AND elements 12*ba*, 12*ca*, 12*da*, 12*fa*, 12*ga* and 12*ha*. As the succeeding shift code marks are detected one by one, the counter 11 steps from "0" through "7." On the other hand, as the information code marks are detected, the OR element 10*b* produces outputs, so that the AND elements 12*ba*, 12*fa* and 12*ga* produce an output to set the flip-flops 13*b*, 13*f* and 13*g*, the other flip-flops remaining reset. Thus, the set output conditions of the flip-flops 13*b*–13*h* are "1 0 0 0 1 1 0."

When the card has been inserted in the backward direction, the detection of the mark *a*7 results in the setting of the flip-flop 6*b*, the set output of which is applied to the AND elements 12*bb*, 12*cb*, 12*db*, 12*fb*, 12*gb* and 12*hb*. As the information code marks *c*5, *c*4 and *c*0 are detected, the AND elements 12*cb*, 12*db* and 12*fb* produce an output to set the flip-flops 13*g*, 12*f* and 13*b*, with the other flip-flops 13*c*, 13*d*, 13*e* and 13*h* remaining reset. Thus, the set output conditions of the flip-flops 13*b*–13*h* are "1 0 0 0 1 1 0," which are exactly the same as those when the card was inserted in the forward direction.

Thus, with the arrangement of FIG. 6, it is possible to read the card information without the help of the direction-distinguishing code mark, regardless of the manner in which the card has been inserted.

Figure 7:
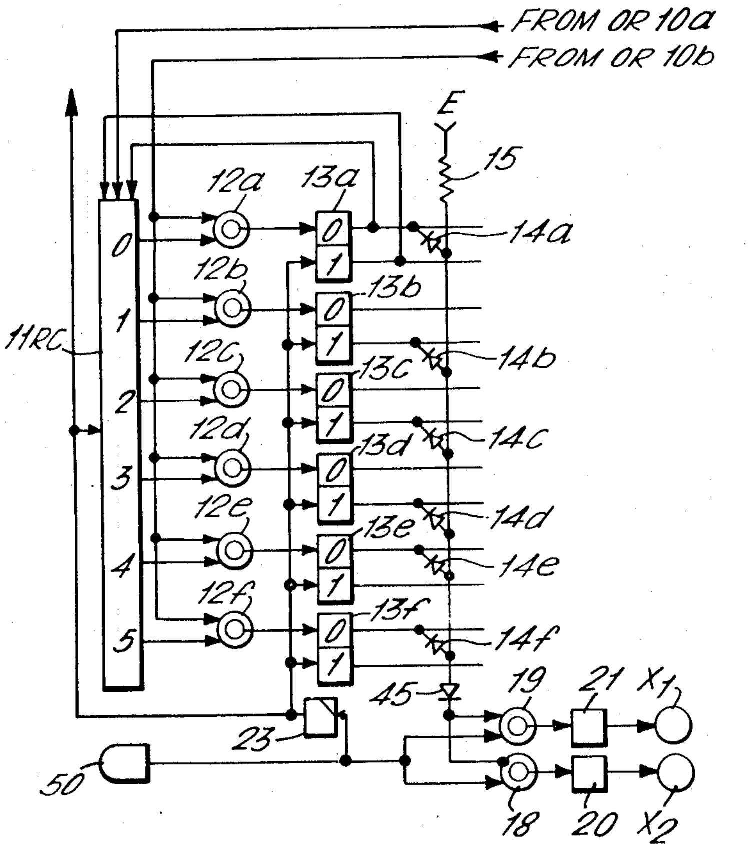

In the arrangements of FIGS. 5 and 6, two AND elements are connected to each of the output terminals of the counter 11 (except for the "3" terminal) and the OR element 36*a*–36*d* or 36*f* are provided in order that a single-diode AND circuit may suffice for memorizing a single-reference information code. For the same purpose a reversible counter may be used, as shown in FIG. 7, with the advantage that a single AND element suffices for each output terminal of the counter, without use of any OR elements such as 36*a*–36*d* (or 36*f*) in FIG. 5 or 6.

FIG, 7 is arranged for the card shown in FIG. 2, and shows a reversible counter 11RC which makes one forward step for every one pulse applied thereto from the OR element 10*a* in FIG. 2. The pulses from the OR element are caused by the detection of the shift code marks on the card. The outputs at the "0" to "5" output terminals of the counter 11RC are applied as one input to AND elements 12*a*–12*f*, respectively. To the other inputs of the AND elements are applied the pulses from the OR element 10*b* (in FIG. 2) caused by the detection of the information code marks and the distinguishing code mark. The outputs from the AND elements 12*a*–12*f* are applied as a set input to flip-flops 13*a*–13*f*, respectively. The set output from the flip-flop 13*a* is applied as a forward stepping signal to the counter 11RC, while the reset output from the flip-flop 13*a* is applied as a backward stepping signal to the counter. When the forward stepping signal is applied, the counter will step forward, that is, its output is shifted from the "0" through "5" terminals successively in the forward direction. When the backward stepping signal is applied, the counter will step backward, that is, its output is shifted from the "0" onto "5" and thence down through "0" terminals successively in the backward or reverse direction.

Suppose that a card has been inserted in the forward direction. Upon detecting of the distinguishing code mark *b* on the card, the OR element 10*b* produces an output pulse, which is applied to one input of the AND element 12*a*. At this time, the counter 11RC produces an output at its "0" terminal, so that the AND element 12*a* produces an output, which sets the flip-flop 13*a*. The set output of the flip-flop 13*a* is applied back to the counter to make it ready to step forward. Thus, every time the OR element 10*a* applies one pulse to the counter, its output is shifted to the next terminal in the forward order. In the course of forward stepping of the counter, the information code marks are detected, and the OR element 10*b* produces corresponding output pulses. When the OR element 10*b* produces an output, which coincides with the output at one of the output terminals of the counter, that one of the AND elements 12*a*–12*f* connected to that one output terminal produces an output. Since the card now used has two information code marks *c*4 and *c* 5, as shown in FIG. 2, the AND elements 12*e* and 12*f* produce an output, so that the flip-flops 13*e* and 13*f* are set in addition to the flip-flop 13*a*. Thus, the set output condition of the flip-flops 13*a*–13*f* is expressed as "1 0 0 0 1 1 0."

When the card is inserted in the backward direction, no distinguishing code mark nor any information code mark is detected before the shift code mark *a*6 is detected. As a result, the flip-flop 13*a* remains reset, applying its reset output as a backward stepping signal to the counter 11RC. Upon detection of the mark *a*6, however, the OR element 10*a* applies a pulse to the counter 11RC, which produces an output at its "5" terminal. Under this condition, when the information code mark *c*5 is detected, the OR element 10*b* produces an output, which coincides with the output at the "5" terminal of the counter, so that the AND element 12*f* produces an output to set the flip-flop 13*f*. In like manner, upon detection of the next information code mark *c*4, the flip-flop 13*e* is set. However, the flip-flops 13*d*–13*b* will not be set, and finally upon detection of the distinguishing code mark *b* the flip-flop 13*a* is set. Thus, the set output condition of the flip-flops 13*a*–13*f* is expressed as "1 0 0 1 1," which is exactly the same as that when the card was inserted in the forward direction.

When the card is valid, the diode AND circuit connected to the output side of the flip-flops produces an output, whether the card is inserted in the forward or backward direction. This output is applied through the diode 45 to one input terminal of the AND element 19 and at the same time to the inhibit terminal of the INHIBIT element 18.

When the card has passed the code detectors 2*a*–2*d*, the passage detector 50 produces an output to be applied to the other input of the AND element 19 and also to the input of the INHIBIT element 18. The operation thereafter of the system is the same as in FIG. 2.

Figure 8:
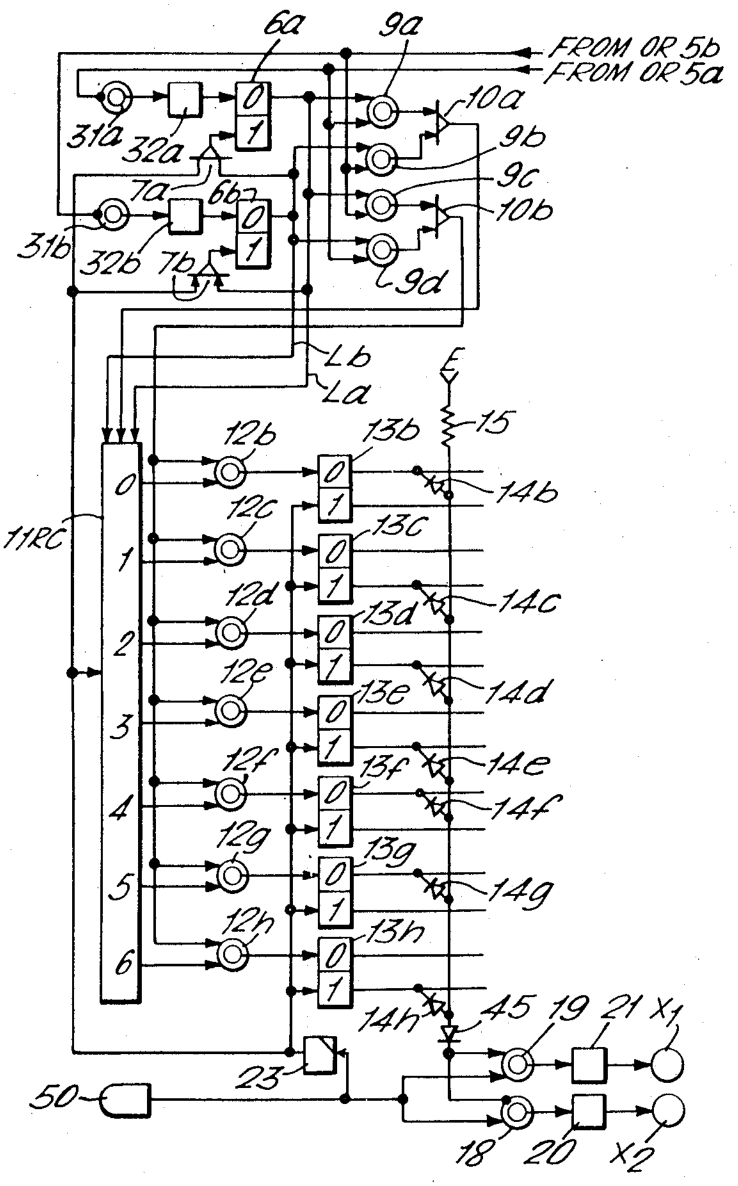

In FIG, 7 the set and reset outputs of the flip-flop 13*a* are utilized as the forward and backward stepping signals, for the reversible counter 11RC. These signals may also be obtained otherwise, as shown in FIG. 8. In this case, the distinguishing code mark may also be omitted. In FIG. 6, when the card is inserted in the forward direction, the flip-flop 6*a* is set prior to the setting of the flip-flop 6*b*, while when the card is inserted in the backward direction, the flip-flop 6*b* is set prior to the setting of the flip-flop 6*a*, as previously mentioned. Therefore, the set outputs of the flip-flops 6*a* and 6*b* can be used as the forward and backward stepping signals, respectively, for the counter through lines L*a* and l*b*. FIG. 8 is arranged for the card shown in FIG. 6. The circuit arrangement and the operation thereof are the same in principle as those of FIG. 7, so that no further explanation will be required.

Having illustrated and described some preferred embodiments of the invention it is understood that the invention is not restricted thereto, but that there are many changes and alternations without departing from the scope of the invention as defined in the appended claims.

What we claim is:

1. A system for reading information recorded on a card in first and second rows of different code markings spaced in a predetermined manner along a primary dimension of said card, the code markings in the first row comprising a shift code and extending beyond those in the second row in both directions along said primary dimension, and the code markings in the second row comprising an information code, comprising:

1. card-receiving means including means for effecting relative movement between the receiving means and the card in a direction parallel to said primary dimension;
2. first and second code-reading means each positioned in said receiving means normal to said direction so that each reads one of said rows of markings for either forward or reverse orientation of said markings with respect to said direction;
3. circuit means coupled to said reading means, including
   a. first and second outputs,
   b. means for detecting which of said code-reading means first reads a marking upon insertion of said card,
   c. means responsive to said detecting means for providing in said first output, signals corresponding to code markings in said first row, and for providing in said second output, signals corresponding to code markings in said second row for either of said orientations,
4. information code storage means responsive to the signals in said first output for storing the signals in said second output;
5. reference code storage means;
6. means coupled to said information code storage means and said reference code storage means for comparing the signals in said second output with said reference code and providing a comparison signal.

2. The system defined in claim 1 wherein said first and second rows of markings are positioned substantially on the centerline of said card and said first and second reading means are positioned facing each other to receive said card therebetween for relative movement along said centerline.

3. The system defined in claim 1 wherein said second row of code markings includes a direction-indicating marking at one end thereof whereby the direction of movement of said card may be detected, and wherein said circuit means includes a direction-indicating means for detecting the presence or absence of a signal corresponding to said marking during said relative movement.

4. The system defined in claim 1 wherein said reference code storage means includes first and second storage means in which said reference code is stored, respectively, in forward and reverse sequences; and wherein said information code storage means includes means for storing said information code in forward or reverse sequence determined by the direction of insertion of the card, and said comparing means includes means for comparing the stored information code with both the forward and reverse sequences of said reference code and providing the same comparison signal for either information code sequence.

5. The system defined in claim 1 wherein said information code storage means includes means for storing said information code in forward sequence for comparison with said reference code, and gating means interposed between said difference-detecting means and said information code storage means for storing said information code in the latter in a forward sequence whether said card is inserted in he forward or reverse direction.

6. The system defined in claim 5 wherein said second row of code markings includes a direction-indicating marking at one end thereof whereby the direction of movement of said card may be detected, and wherein said circuit means includes direction-indicating means coupled to said gating means for detecting the presence or absence of a signal corresponding to said marking during said relative movement and providing a sequence control signal to said gating means.

7. The system defined in claim 1 wherein said information code storage means includes means for storing said information code in forward sequence for comparison with said reference code; and further including gating means coupled to the second output of said circuit means for applying said information code signals to said information code storage means in forward or reverse sequence; and reversible counting means responsive to said difference-detecting means and to the first output of said circuit means for controlling said gating means to apply said information code signals to said information-code-storing means in forward or reverse sequence determined by the direction of insertion of the card.

8. The system defined in claim 1 wherein said second row of code markings includes a direction-indicating marking at one end thereof whereby the direction of movement of said card may be detected, and wherein said circuit means includes direction-indicating means coupled to said gating means for detecting the presence or absence of a signal corresponding to said marking during said relative movement and providing a sequence control signal to said gating means.

9. The system defined in claim 1 wherein said rows of marking are spaced substantially symmetrically on opposite sides of the centerline of said card, and said first and second reading means are positioned to read said rows of marking on one face of the card; said system further including:

1. third and fourth reading means positioned in said receiving means so that each reads one of said rows of markings on the opposite face of said card,
2. means combining the outputs of said first second, third and fourth reading means to provide first and second output signals, one output signal for each row of markings on said card, regardless of its orientation in said receiving means, and
3. means coupling said first and second output signals to said circuit means in place of the outputs from said first and second code-reading means.

UNITED STATES PATENT OFFICE
CERTIFICATE OF CORRECTION

Patent No. 3,602,697 Dated August 31, 1971

Inventor(s) Toshio Tanaka; Yukiø Mizuta

It is certified that error appears in the above-identified patent and that said Letters Patent are hereby corrected as shown below:

Code [73], the Assignee should read -- Omron Tateisi Electronics Co. --.

Claim 8, line 1, should read -- The system defined in claim 7 wherein said second row of --

Signed and sealed this 7th day of March 1972.

(SEAL)
Attest:

EDWARD M.FLETCHER,JR.
Attesting Officer

ROBERT GOTTSCHALK
Commissioner of Patents